United States Patent
Spilker, Jr.

[11] Patent Number: 6,058,135
[45] Date of Patent: May 2, 2000

[54] QUASI-OPTIMAL RECEIVER FOR TRACKING AND ACQUISITION OF A SPLIT SPECTRUM PN GPS C/A SIGNAL

[75] Inventor: James J. Spilker, Jr., Woodside, Va.

[73] Assignee: Stanford Telecommunications, Inc., Sunnyvale, Calif.

[21] Appl. No.: 09/250,846

[22] Filed: Feb. 17, 1999

Related U.S. Application Data

[60] Provisional application No. 60/076,001, Feb. 26, 1998.

[51] Int. Cl.$^7$ ............................................. H04B 1/69
[52] U.S. Cl. ............................................. 375/130; 370/316
[58] Field of Search .................................. 375/200, 367; 370/316, 324; 455/12.1, 13.2; 701/213

[56] References Cited

U.S. PATENT DOCUMENTS

| | | | |
|---|---|---|---|
| 5,361,276 | 11/1994 | Subramanian | 375/200 |
| 5,592,481 | 1/1997 | Wiedeman et al. | 370/316 |
| 5,659,318 | 8/1997 | Madsen et al. | 342/25 |
| 5,659,573 | 8/1997 | Bruckert et al. | 375/200 |

*Primary Examiner*—Don N. Vo
*Attorney, Agent, or Firm*—Jim Zegeer

[57] ABSTRACT

A receiver for tracking and acquisition of the split spectrum PN GPS C/A signal constellation from an earth-orbiting satellite for radiolocation includes an RF front end for receiving and downconverting the split spectrum PN GPS C/A signals from the earth-orbiting satellite to an IF signal. The total power in the split spectrum PN GPS C/A signal is compressed and the compressed split spectrum PN GPS C/A signals are supplied to a utilization device.

1 Claim, 4 Drawing Sheets

QUASI-OPTIMAL RECEIVER FOR TRACKING AND ACQUISITION OF A SPLIT SPECTRUM PN GPS C/A SIGNAL

REFERENCE TO RELATED APPLICATION

This application is the subject of provisional application Ser. No. 60/076,001 filed Feb. 26, 1998 with the same title.

INTRODUCTION

In my paper entitled [1]"Spectral Performance Characteristics of a Split Spectrum GPS C/A Signal", incorporated herein by reference, I proposed that a high performance split spectrum civil signal can be added to the L2 channel of the GPS satellites. Rather than use a single C/A signal band at the center of the L2 frequency, I provide a split spectrum C/A type signal wherein the split spectrum signal has two spectral peaks on either side of the center frequency at the first spectral nulls of the P/Y code. Thus, the split spectrum C/A signal has spectral peaks at +/−10.23 MHz offset from the L2 frequency of 1227.6 MHz. FIG. 1 shows the power spectral density of the split spectrum C/A signal.

[1]See the attached paper entitled "Spectral Performance Characteristics of a Split Spectrum GPS C/A Signal."

In FIG. 1, the power spectral density of the split spectrum C/A signal is illustrated. All except 0.912 dB of the power is contained in the fundamental components on either side of the L2 center frequency.

FIG. 2 shows the same power spectrum as FIG. 1 except that only the center 24 MHz is shown.

This signal has several important features:

It is easy to generate digitally in a constant envelope form by modulating a C/A code at 1.023 MHz clock rate with a square wave with a 20.46 MHz chip rate (square wave frequency of 10.23 MHz). The square wave is represented by $$p[t] = \frac{4}{\pi}\left(\sin[2\pi(10.23\times 10^6)] + \frac{1}{3}\sin[3\times 2\pi(10.23\times 10^6)] + \ldots\right)$$

The power in the fundamental term represents $8/\pi^2 = 0.8106$ of the total power or all but 0.91 dB of the power. Note that if the P code is filtered to +/−12 MHz, it loses approximately 0.49 dB of its power.

This civil signal has a much wider rms bandwidth (or Gabor Bandwidth) of approximately 10.038 as compared to a rms bandwidth of roughly 1.128 MHz for the conventional C/A code. Thus the split spectrum C/A signal has a potentially higher tracking accuracy[1] than that of the conventional C/A signal by a factor of more than 8 to 1.[2]

The signal is easily generated in digital form in the satellite.

The Split Spectrum C/A signal permits high accuracy measurements of the ionosphere by civil user.

The Split Spectrum C/A signal is an asset for carrier phase ambiguity.

The split spectrum C/A signal can be prevented from being used by an enemy in a given region without causing significant loss in performance to the military users of GPS.

[1] J. J. Spilker, Jr., in B. W. Parkinson and J. J. Spilker, Jr., GPS Theory and Applications, Vol. 1, AIAA, Washington, D.C., 1996, Chapter 5.
[2] John Betz of Mitre has studied frequency offset versions of military codes generated by more conventional analog means. These military signals also have an increased rms bandwidth and improved tracking accuracy. See Mitre Product MP97B0000103, November, 1997.

THE PRESENT INVENTION

The object of this invention is to provide a novel quasi-optimal receiver design which permits both initial acquisition as well as high accuracy tracking which takes advantage of the wide rms bandwidth of the signal.

The modulated signal on the in-phase channel on L2 for the civil signal then has the form $$s_i[t]=d_i[t]p[t]c_i[t]\sin[\omega_0 t]=d_i[t]c_i[t]\sin[2\pi(10.23\times 10^6)t]\sin[\omega_0 t]+\ldots$$

where $d_i[t]$ is the 50 bps binary data stream, $d_i[t]=\pm 1$ $p[t]$ is a square wave with a 10.23 MHz frequency (or a 20.46 MHz chip rate), $p[t]=\pm 1$ $c_i[t]$ is the C/A code at 1.023 MHz chip rate for satellite i, $c_i[t]=\pm 1$ and $\omega_0$ is the L2 carrier frequency at 1227.6 MHz.

A receiver for tracking and acquisition of the split spectrum PN GPS C/A signal constellation from an earth-orbiting satellite for includes an RF front end for receiving and downconverting the split spectrum PN GPS C/A signals from the earth-orbiting satellite to an IF signal. The total power in the split spectrum PN GPS C/A signal is compressed and the compressed split spectrum PN GPS C/A signals are supplied to a utilization device.

The satellite power amplifier/RF filter is assumed to remove the harmonics of the square wave so that only the fundamental component is received. The same receiver concept operates for other choices of frequencies as well, as long as there is a significant difference between the various clock rates, namely:

$$50 \ll 1.023\times 10^6 \ll 20.46\times 10^6 \ll 1227.6\times 10^6$$

DESCRIPTION OF THE DRAWINGS

The above and other objects, advantages and features of the invention will become more apparent when considered with the following specification and accompanying drawings, wherein.

QUASI-OPTIMAL DELAY LOCK LOOP FOR THE SPLIT SPECTRUM C/A SIGNAL

Figure 1:
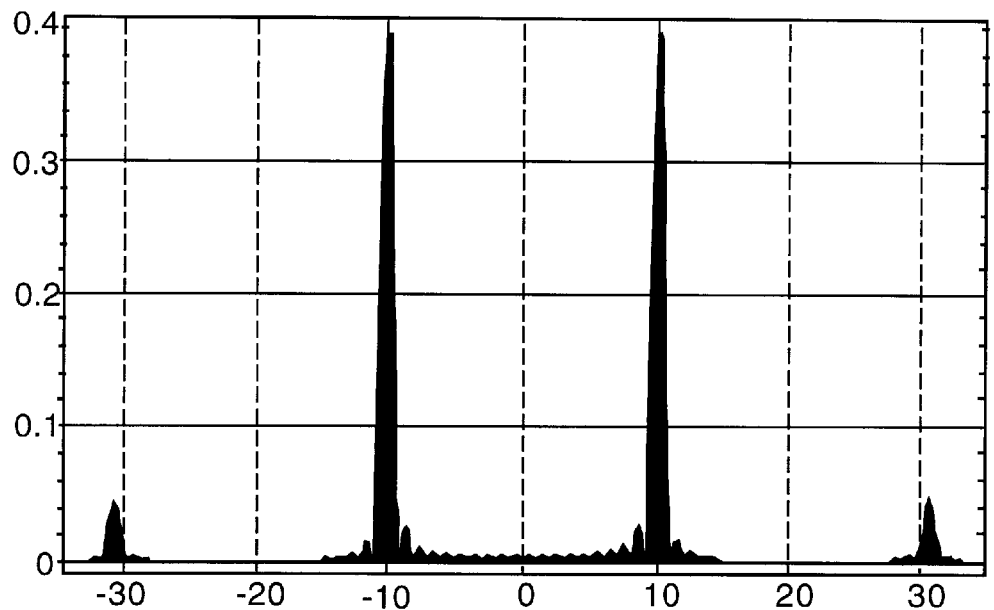
FIG. 1 is a graph showing the power spectral density of the split spectrum GPS C/A signal, the horizontal frequency scale is in MHz.
Figure 2:
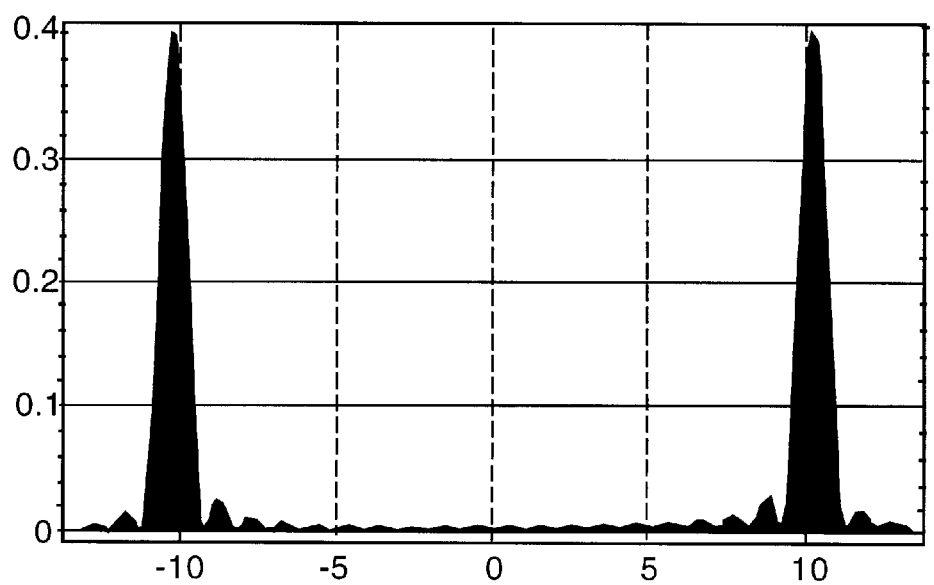
FIG. 2 shows the same power spectrum as FIG. 1 except that only the center 24 MHz is shown.
Figure 3:
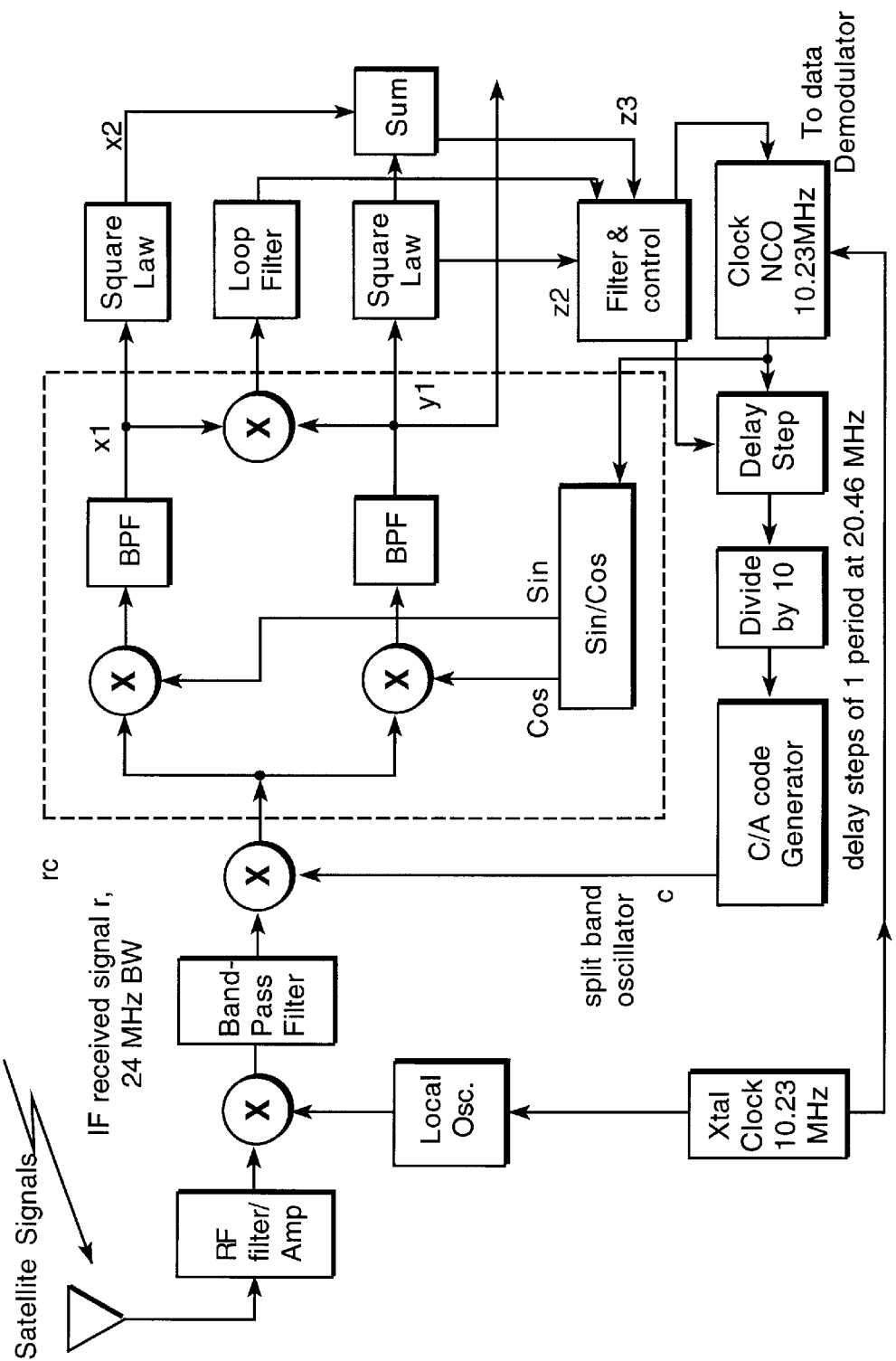
FIG. 3 is a simplified block diagram of a quasi-optimal tracking/correlation receiver for the split spectrum C/A signal, the high accuracy tracking mode is shown shaded.

The receiver configuration shown in FIG. 3 has the following major properties:

It provides quasi-optimal high accuracy tracking of the GPS Split Spectrum C/A signal taking full advantage of the large rms or Gabor bandwidth of this signal and its full power. It uses as a reference an approximation to the differentiated signal which the author has shown to be optimum.[3]

Since the discriminator characteristic has multiple sidelobes for the quasi-optimal tracker, it is important to be able to acquire the C/A code directly without those sidelobes.

Outputs are shown which can be fed to standard demodulators for GPS navigation data recovery.

Quasi-Optimal Tracking Receiver for the Split Spectrum C/A Signal

Although the receiver shown is shown in its analog form for simplicity, it should be recognized that the receiver would really be implemented using its digital baseband equivalent wherein the signal is sampled with in-phase and quadrature samples instead of the IF bandpass filters shown in the first block diagrams. FIG. 3 shows a simplified block diagram of the quasi-optimal split spectrum C/A receiver.

It has been shown that the optimal tracking receiver operates by multiplying the received signal by the time differentiated reference signal, namely:

[3] J. J. Spilker, Jr., in B. W. Parkinson and J. J. Spilker, Jr., GPS Theory and Applications, Vol. 1, AIAA, Washington, D.C., 1996, Chapter 7.

$$\frac{\partial}{\partial t}(c_i[t]\sin[2\pi \times 10.23 \times 10^6 t]) = (2\pi \times 10.23 \times 10^6)c_i[t]\cos[2\pi \times 10.23 \times 10^6 t] + c_i'[t]\sin[2\pi \times 10.23 \times 10^6 t]$$

$$\cong (2\pi \times 10.23 \times 10^6)c_i[t]\cos[2\pi \times 10.23 \times 10^6 t]$$

In this example, it is assumed that the derivative of c is small compared to the sinusoidal 10.23 MHz term. The product of this differentiated reference with the received signal provides a discriminator characteristic which gives a term proportional the delay error. This discriminator characteristic with the term proportional to delay error then can be used to correct a clock which is synchronized with the clock of the received signal.

In the discussion that follows it is assumed that the signal has been acquired in tracking delay and that our delay estimate is small compared to a C/A code chip width of approximately 1 microsecond. It is shown later that one can search the delay using the same operations shown in FIG. 3 to acquire the split spectrum C/A signal to make this assumption valid.

Thus in FIG. 3 the received signal plus noise is first down-converted to a convenient IF frequency (generally some multiple of 1.023 MHz). The signal is then multiplied in succession by $$c_i[t-\hat{\tau}] \text{ and then by } \cos[2\pi \times 10.23 \times 10^6 (t-\hat{\tau})]$$

Ignoring the noise terms for the moment, the output of the first product is $$d_i[t-\tau]c_i[t-\tau]\sin[(2\pi \times 10.23 \times 10^6)(t-\tau)](c_i[t-\hat{\tau}]\cos[(2\pi \times 10.23 \times 10^6)(t-\hat{\tau})])$$

After band-pass filtering with a filter of bandwidth narrow compared to 1.023 MHz, but wide enough to pass the residual doppler frequency offset and the data modulation, the output of this correlator can be approximated by $$x1 \cong d_i[t]R_c[\epsilon]\sin[(2\pi \times 10.23 \times 10^6)\epsilon]\sin[\omega_1 t + \phi[\epsilon]]$$

where $R_c[\epsilon]$ is the approximately triangular autocorrelatiion function of the C/A signal.

Notice that this product has correlated with both of the spectral bands of the split spectrum C/A signal at the same time and not just the upper or lower band separately. Thus the entire power in the signal is employed and not just half of it.

In order to remove the data modulation effect and the effects of the IF carrier, we also form the product y1 in the upper cnannel of FIG. 3.

$$y1 \cong d_i[t]R_c[\epsilon]\cos[(2\pi \times 10.23 \times 10^6)\epsilon]\sin[\omega_1 t + \phi[\epsilon]]$$

It should be pointed out that the output, y1, of this quadrature channel correlator with the cos term can be used both to recover both the data modulation and the carrier phase by using a coherent BPSK data demodulator as is shown later.

For the moment however the focus is on the precision tracking operation. The receiver next forms the product of x1 and y1 to remove both the data modulation and the IF carriers, namely:

$$x1 \times y1 \cong \frac{1}{2}d_i^2[t-\tau]R_c^2[\epsilon]\sin[(2\pi \times 10.23 \times 10^6)\epsilon]\cos[(2\pi \times 10.23 \times 10^6)\epsilon]$$

$$\cong \frac{1}{2}R_c^2[\epsilon]\sin[(2\pi \times 10.23 \times 10^6)\epsilon]\cos[(2\pi \times 10.23 \times 10^6)\epsilon]$$

$$\cong \frac{1}{4}R_c^2[\epsilon]\sin[2\epsilon(2\pi \times 10.23 \times 10^6)]$$

$$\cong D[\epsilon]$$

This operation is very much reminiscent of the commonly used Costas loop operation in BPSK carrier recovery. Again the key point is that we have compressed the total power in the split spectrum C/A signal, i.e., both sidebands into the narrow IF bandwidth of the two band pass filters BPF of FIG. 3. Thus the noise performance of this tracking loop is making full use of the total power in the C/A signal.

Figure 4:
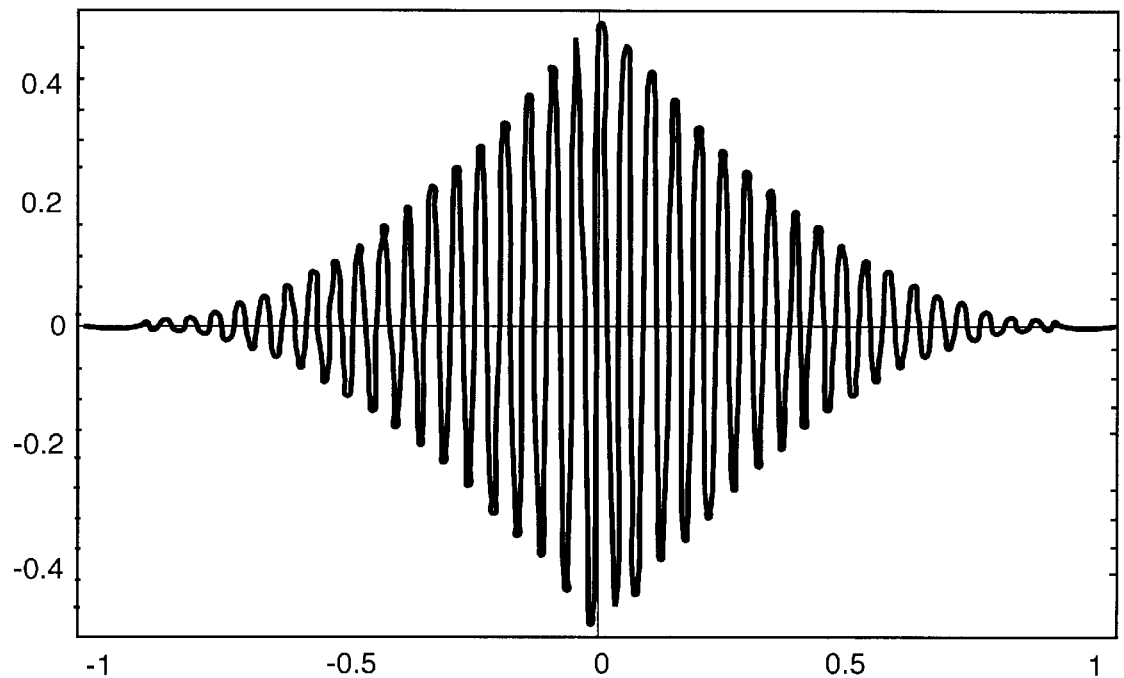
FIG. 4 is a plot showing the discriminator characteristic.

The quantity $D[\epsilon]$ is the discriminator characteristic and has a strong dependency on the delay error. Notice the $\sin[2\epsilon(2\pi \times 10.23 \times 10^6)]$ term. FIG. 4 shows a plot of this discriminator characteristic.

FIG. 4 shows the discriminator characteristic of the quasi-optimal split spectrum C/A delay lock loop receiver. The multiple ambiguities can be resolved with envelope detection of the C/A correlation as shown in FIG. 3.

This discriminator characteristic has a very steep slope at the origin as consistent with the frequency separation between the two split spectrum C/A signals. For small values of delay error this curve is linear. Clearly this discriminator curve has many ambiguities as one would expect. The receiver can track on any one of the ambiguous positive slope lock on points provided that one is reasonable close to the peak.

Noncoherent Delay Lock Acquisition, Tracking, and Data Recovery of the C/A Signal Rather than forming the product of the x1 and x2 signals to form the ultra-precision split spectrum code tracking, initial acquisition can sum the squares of x1 and x2 to maximize the cross-correlation. If one then tracks on the high accuracy split spectrum tracker as previously discussed, one can then step the delay in increments of a frequency off-set period to maximize the cross-correlation in the sum of the squares of x1 and x2.

The sum of the squares of x1 and x2 is $$x1^2 + y1^2 = (d_i[t]R_c[\varepsilon]\sin[(2\pi \times 10.23 \times 10^6)\varepsilon]\sin[\omega_1 t + \phi[\varepsilon]])^2 +$$
$$(d_i[t]R_c[\varepsilon]\cos[(2\pi \times 10.23 \times 10^6)\varepsilon]\sin[\omega_1 t + \phi[\varepsilon]])^2$$
$$\cong \frac{1}{2}R_c^2[\varepsilon]$$

Figure 5:
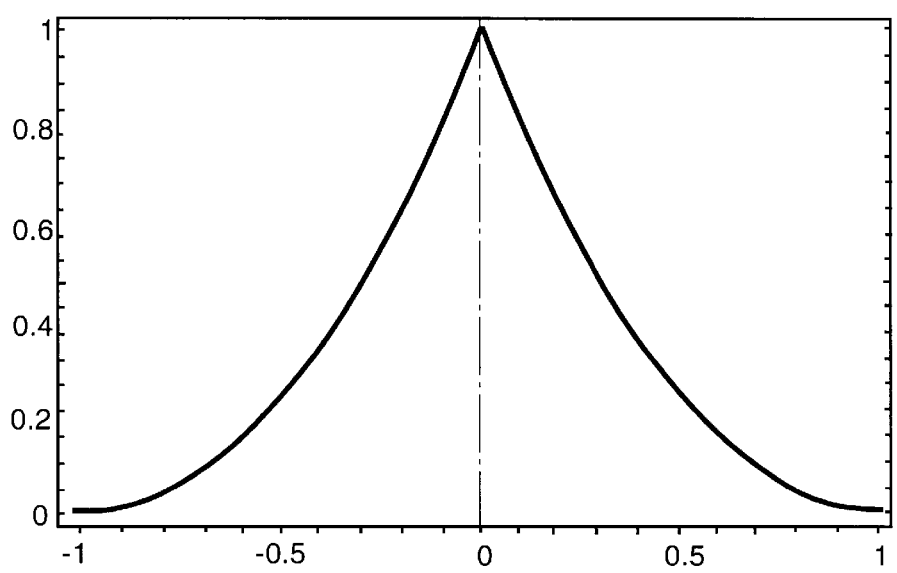
FIG. 5 is a plot showing the correlator output.

Thus the output of this correlator is simply the envelope of the previous delay lock loop discriminator characteristic of FIG. 4 and is shown in FIG. 5.

FIG. 5 shows the autocorrelation function squared for a C/A PN signal when approximated by a random sequence. The horizontal scale is time in microseconds. Obviously, the real C/A code has small sidelobes as recited in the above-referenced GPS book by Parkinson and Spilker.

Note also that the output yi contains the data modulated BPSK signal which can be fed to a standard coherent BPSK demodulator. If $\varepsilon \approx 0$, then $$y1 \approx d_i[t]R_c[0]\sin[\omega_1 t + \phi]$$

which is a standard BPSK signal with binary data modulation.

Digital Implementation of the Quasi-Optimal Receiver for the Split Spectrum C/A Signal The simplified block diagram of the quasi-optimal tracking receiver for the split spectrum C/A code can obviously be implemented digitally. Note that the received signal will generally be received with a negative signal-to-noise ratio. The IF signal can be sampled and quantized using a 3-bit quantizer at IF as shown in FIG. 6.

Figure 6:
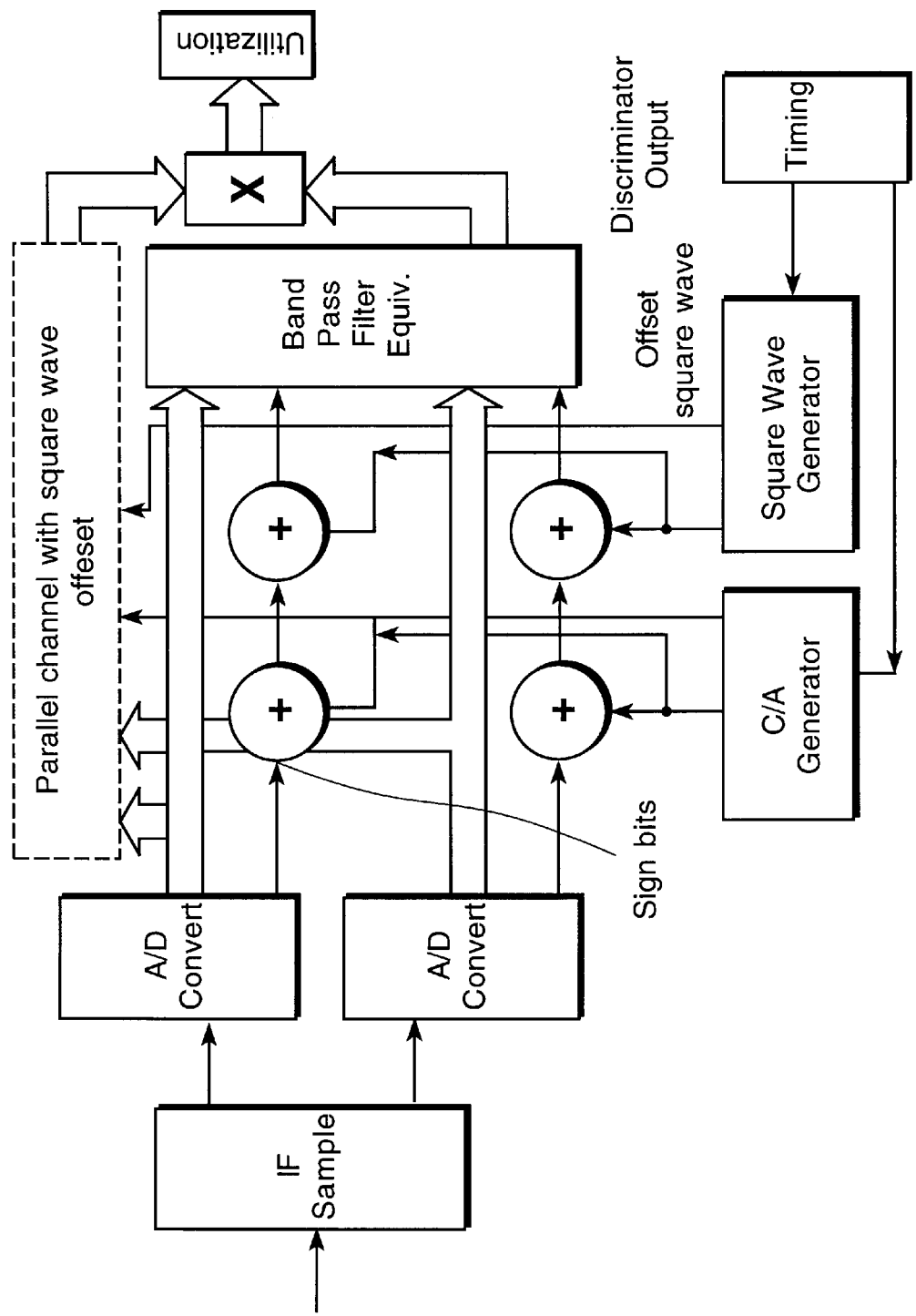
FIG. 6 is an illustration of simplified digital equivalent of the quasi-optimal.

FIG. 6 is a simplified digital equivalent of the quasi-optimal tracking receiver of FIG. 3. Only the high accuracy tracking discriminator is shown for simplicity. There are two offset versions of the square wave representing the sin and cos versions of the split spectrum signal. Only one of the channels is shown. The two A/D converters can be a single, time-shared unit.

The simplified digital block diagram of FIG. 6 begins by sampling the IF at a sample rate consistent with the IF bandwidth, namely, approximately 2.5 or more times the IF bandwidth. The samples are then quantized as in-phase and quadrature samples in the upper and lower channels. The quantizer output is divided into the signal and fine resolution bits. The sign bits are multiplied, modulo two added in turn by the C/A code and the two offset versions of the square wave representing the sin and cos versions of the split spectrum offset frequency. Since the received signal has no harmonic content, a square wave can be used in the multiplication operation rather than sin functions.

The output of the multipliers is then bandpass filtered, low pass filtering on the I and Q channels. The two filter outputs are then multiplied to form the discriminator output as shown. The upper channel and its bandpass filter are only partially shown for simplicity. The channels are then supplied to a utilization device to provide conventional GPS location solutions and use functions such as displays, controls, etc.

Each section of the quasi-optimal receiver for the split spectrum signal can be similarly implemented in digital form. Complete multichannel quasi-optimal receivers can be implemented on a single chip.

What is claimed is:

1. A receiver for tracking and acquisition of a split spectrum PN GPS C/A signal constellation from earth-orbiting satellite for radiolocation comprising: an RF front end for receiving and downconverting said split spectrum PN GPS C/A signals from said earth-orbiting satellites to an IF signal containing said split spectrum PN GBS C/A signals, means for compressing the total power in said split spectrum PN GPS C/A signals, an utilization device, and means for supplying compressed split spectrum PN GPS C/A signals to said utilization device.

* * * * *

UNITED STATES PATENT AND TRADEMARK OFFICE
CERTIFICATE OF CORRECTION

PATENT NO. : 6,058,135
DATED : May 2, 2000
INVENTOR(S) : James J. Spilker, Jr.

It is certified that error appears in the above-identified patent and that said Letters Patent is hereby corrected as shown below:

<u>Title page,</u>
Please cancel the assignee name now appearing on the title page section [73] (2 lines) and substitute the following two lines as follows:

[73] Assignee: ITT MANUFACTURING ENTERPRISES, INC.,
Wilmington, Delaware

Signed and Sealed this

Fifteenth Day of January, 2002

*Attest:*

JAMES E. ROGAN
*Attesting Officer*     Director of the United States Patent and Trademark Office